United States Patent
Faucher et al.

(10) Patent No.: US 8,244,880 B2
(45) Date of Patent: *Aug. 14, 2012

(54) CONNECTION MANAGEMENT METHOD, SYSTEM, AND PROGRAM PRODUCT

(75) Inventors: Marc R. Faucher, South Burlington, VT (US); Christos J. Georgiou, Scarsdale, NY (US); Ann Marie Rincon, Pocatello, ID (US)

(73) Assignee: International Business Machines Corporation, Armonk, NY (US)

( * ) Notice: Subject to any disclaimer, the term of this patent is extended or adjusted under 35 U.S.C. 154(b) by 439 days.

This patent is subject to a terminal disclaimer.

(21) Appl. No.: 12/191,336

(22) Filed: Aug. 14, 2008

(65) Prior Publication Data
US 2008/0313339 A1    Dec. 18, 2008

Related U.S. Application Data

(63) Continuation of application No. 11/379,611, filed on Apr. 21, 2006, and a continuation of application No. PCT/US03/33687, filed on Oct. 22, 2003.

(51) Int. Cl.
*G06F 15/16* (2006.01)
(52) U.S. Cl. .......... 709/227; 709/217; 711/118
(58) Field of Classification Search .......... 709/217, 709/227; 711/118
See application file for complete search history.

(56) References Cited

U.S. PATENT DOCUMENTS

| | | | |
|---|---|---|---|
| 5,745,727 A | 4/1998 | Chau et al. |
| 5,852,717 A | 12/1998 | Bhide et al. |
| 5,884,297 A | 3/1999 | Noven |
| 5,914,956 A | 6/1999 | Williams |
| 6,085,246 A | 7/2000 | Brandt et al. |
| 6,105,067 A | 8/2000 | Batra |
| 6,134,589 A | 10/2000 | Hultgren |
| 6,178,460 B1 | 1/2001 | Maddalozzo, Jr. et al. |
| 6,226,644 B1 | 5/2001 | Ciscon et al. |
| 6,308,238 B1 | 10/2001 | Smith et al. |
| 6,339,794 B2 | 1/2002 | Bolosky et al. |
| 6,397,253 B1 | 5/2002 | Quinlan et al. |
| 6,434,152 B1 | 8/2002 | Yamamura |
| 6,459,901 B1 | 10/2002 | Chawla et al. |

(Continued)

FOREIGN PATENT DOCUMENTS
JP    2003006036 A    1/2003
(Continued)

OTHER PUBLICATIONS

Faucher et al., Office Action Communication, Mar. 19, 2009, 9 pages.
(Continued)

*Primary Examiner* — David Lazaro
(74) *Attorney, Agent, or Firm* — Hoffman Warnick LLC; Wenjie Li

(57) ABSTRACT

The invention provides a method, system, and program product for managing a connection. In particular, the invention manages connection information in memory based on an expected usage of the corresponding connection. Connection information can be stored in faster memory, such as cache memory, when the connection is expected to have numerous additional messages. Similarly, the connection information for a connection not expected to have many additional messages can be swapped out of the cache memory and stored in relatively slower memory. As a result, the connection information that is more frequently used is more likely to be available in a faster memory.

19 Claims, 2 Drawing Sheets

U.S. PATENT DOCUMENTS

| | | |
|---|---|---|
| 6,519,643 B1 | 2/2003 | Foulkes et al. |
| 6,563,839 B1 | 5/2003 | Hallenstal et al. |
| 6,631,118 B1 | 10/2003 | Jones |
| 6,636,898 B1 | 10/2003 | Ludovici et al. |
| 7,003,572 B1 | 2/2006 | Lownsbrough et al. |
| 7,007,092 B2 | 2/2006 | Peiffer |
| 7,032,073 B2 * | 4/2006 | Mizrachi et al. ............ 711/119 |
| 7,107,344 B2 | 9/2006 | Davis et al. |
| 7,130,912 B2 | 10/2006 | Nishikado et al. |
| 7,146,417 B1 | 12/2006 | Coile et al. |
| 7,200,110 B1 | 4/2007 | Burns et al. |
| 7,242,941 B2 | 7/2007 | Adatrao et al. |
| 7,287,082 B1 | 10/2007 | O'Toole, Jr. |
| 2002/0042828 A1 | 4/2002 | Peiffer |
| 2002/0057708 A1 | 5/2002 | Galbi et al. |
| 2002/0069284 A1 | 6/2002 | Slemmer et al. |
| 2003/0028662 A1 | 2/2003 | Rowley et al. |

FOREIGN PATENT DOCUMENTS

| | | | |
|---|---|---|---|
| JP | 2003110603 A | 4/2003 | |
| KR | 20060100383 A | 9/2006 | |
| WO | 0076254 A1 | 12/2000 | |
| WO | 02076042 A1 | 9/2002 | |
| WO | WO 02/076042 A1 * | 9/2002 | |
| WO | 03085890 A1 | 10/2003 | |
| WO | 2005050468 A1 | 6/2005 | |

OTHER PUBLICATIONS

European Patent Application No. 03819045.0, Supplementary Search Report dated Jan. 29, 2010.

Yang et al., "Connection Caching Technique with Host Grouping," IEEE 0-8186-7557, Aug. 1996, pp. 374-378.

Yang et al., "A Performance Study of a Connection Caching Technique," IEEE WESCANEX Proceedings 95CH3581-6/0-7803-2741, Jan. 1995, pp. 90-94.

Dittia et al., "Design of the APIC: A High Performance ATM host-Network Interface Chip," IEEE 0743-166X, 1995, pp. 179-187.

Williamson et al., "A Case for Context-Aware TCP/IP," ACM Digital Library, pp. 11-23.

Application No. 2006-7007748 Title PF/Storage MP#4/MB) Connection management Method, Sstem and Program Procucts Filed: Oct. 22, 2005 Reference cited by KIPO Examiner as Prior Art to the following KR Claims.

Rupal Dharia, "PCT International Preliminary Examination Report", May 24, 2006, 11 pages.

Shingles, Kristie D., "PTO Office Action", U.S. Appl. No. 11/379,611, Notification Date: Jun. 3, 2008, 21 pages.

Shingles, Kristie D., "PTO Final Office Action", U.S. Appl. No. 11/379,611, Notification Date: Nov. 3, 2008, 11 pages.

JPO Office Action—Sep. 28, 2010—Prepared by Yuko Yasuda Application No. 2005510813 Filed: Oct. 22, 2003.

PCT/US03/33687, Amendment Under Art. 34, Jan. 11, 2006, 8 pages.

PCT/US03/33687, PCT Written Opinion, Nov. 14, 2005, 5 pages.

PCT/US03/33687, Information Concerning Elected Office Notified of Their Election, Nov. 3, 2005, 5 pages.

PCT/US03/33687, Response to Invitation to Correct defects in the Demand, Oct. 20, 2005, 1 page.

PCT/US03/33687, PCT Demand, Aug. 18, 2005, 4 pages.

* cited by examiner

CONNECTION MANAGEMENT METHOD, SYSTEM, AND PROGRAM PRODUCT

CLAIM FOR PRIORITY

This is a continuation of International Application PCT/US2003/33687, with an International Filing Date of Oct. 22, 2003, currently pending, and U.S. application Ser. No. 11/379,611, Filed on Apr. 21, 2006, currently pending.

TECHNICAL FIELD

The invention generally relates to managing connections.

BACKGROUND ART

Every day, millions of bytes of data are transferred between computers over networks such as the Internet. The data can comprise, for example, web pages, advertisements, music files, e-mail messages, and documents. The data is sent using a communications protocol such as Fiber Channel Protocol (FCP), Synchronous Optical Network (SONET), Transmission Control Protocol/Internet Protocol (TCP/IP), or the like. Using TCP/IP to illustrate the general function of communications protocols, TCP is used to establish and maintain a connection at both the source and destination computers, while IP serves to route the data between one or more networks to the destination computer. As a result, a computer on a first network can have a connection with a computer on a second network, and the networks can be connected via one or more additional networks, as is commonly done with communications over the Internet.

Once a TCP connection is established, a maximum packet size is negotiated between the source and destination computers. While TCP can support packets up to sixty-four kilobytes, the size may be limited by the underlying network. For example, an Ethernet network provides for a maximum of 1,518 bytes per message. In any event, data is packaged into one or more TCP "segments" for communication, wherein each segment is less than or equal to the maximum packet size. Each segment is then further packaged by the IP protocol and/or the underlying network (e.g., Ethernet) before being sent as a message. As part of the packaging process, each protocol (e.g., TCP, IP), and the network (e.g., Ethernet) may add required information to the data in a corresponding "header." The header information is then used by the protocol/network to appropriately route the message, check for errors, reconstruct the data, etc.

For example, a source computer may desire to send a file having three kilobytes of data to a destination computer using TCP/IP over an Ethernet network. Initially, the data for the file could be packaged into three TCP segments. Each TCP segment would be further packaged by the IP protocol and the Ethernet network before being sent as a message to the destination computer. As a result, the message would include an Ethernet header, an IP header, a TCP header, and the data. The information in the Ethernet header is used to correctly route each message to the destination computer. Upon arrival at the destination computer, each message is unpackaged and the TCP and IP header information in each message is used to reassemble the data to recreate the file at the destination computer.

Once established, the TCP connection between the source computer and destination computer remains open until the data transfer is complete. A TCP connection for transferring a small amount of data is considered to be a "short lived" connection, while a TCP connection for transferring a large amount of data is considered to be a "long lived" connection. A computer sending/receiving data over a network such as the Internet may be simultaneously processing messages for tens (e.g., an end user computer) or hundreds or even thousands (e.g., a server) of TCP connections simultaneously. In order to match each message received with the appropriate TCP connection, the computer maintains information on each TCP connection in an entry in a "connection table." Consequently, upon receipt of a message, the computer matches information in the TCP header with the appropriate connection table entry. When a match is found, the data is forwarded for further processing by the appropriate application.

The amount of time required to match a TCP connection with a received message can be critical to the overall performance of the computer. In general, a computer frequently includes a cache memory in order to speed up access to portions of a memory such as the connection table. In cache memory, a "least recently used" (LRU) algorithm is typically used to determine what data is to be swapped out of the cache memory when the cache memory is full. In the LRU algorithm, the data in the cache that has gone the longest without being accessed is selected to be swapped out. The LRU algorithm works well for most programs, which often access a block of data several times in a short duration, before not accessing the block of data for an extended period of time.

Since a connection table may be frequently accessed during communications, all or some of the connection table may be stored in cache memory. However, when selecting cache data to swap out, the LRU algorithm may not select the data that would be ideally removed. For example, due to the routing of messages, a long lived connection may have a large amount of time between messages. As a result, connection data for a long lived connection may be selected for removal in favor of data for more recently used, short lived connections. However, since the long lived connection will be used more frequently over time, it may be more efficient to leave the long lived connection data in the cache memory.

As a result, there exists a need for an improved method, system, and program product for managing connection information that determines an expected usage of a connection and stores the connection information in memory based on the expected usage.

DISCLOSURE OF THE INVENTION

The invention provides a method, system, and program product for managing a connection. In particular, the invention can determine an expected usage when the connection is generated and/or update the expected usage during the life of the connection. In any event, the invention manages connection information in memory based on the expected usage of the corresponding connection. For example, connection information for a connection that has a high expected usage can be stored in cache memory for faster access. Similarly, the connection information for a connection having a low expected usage can be swapped out of the cache memory and stored in relatively slower memory. As a result, connection information for more frequently used connections will be more likely to be found in cache memory, thereby increasing the communications performance of the system.

A first aspect of the invention provides a method of managing a connection, the method comprising: obtaining connection information for the connection; determining an expected usage for the connection; and managing the connection information in memory based on the expected usage.

A second aspect of the invention provides a connection management system, comprising: a connection system that obtains connection information for a connection; a usage system that determines an expected usage for the connection; and a storage system that manages the connection information in memory based on the expected usage.

A third aspect of the invention provides a computer program product comprising a computer useable medium having computer readable program code embodied therein for managing a connection, the program product comprising: program code configured to obtain connection information for the connection; program code configured to determine an expected usage for the connection; and program code configured to manage the connection information in memory based on the expected usage.

The illustrative aspects of the invention are designed to solve the problems herein described and other problems not discussed, which are discoverable by a skilled artisan.

BRIEF DESCRIPTION OF THE DRAWINGS

These and other features of this invention will be more readily understood from the following detailed description of various embodiments of the invention taken in conjunction with the accompanying drawings in which.

Figure 1:
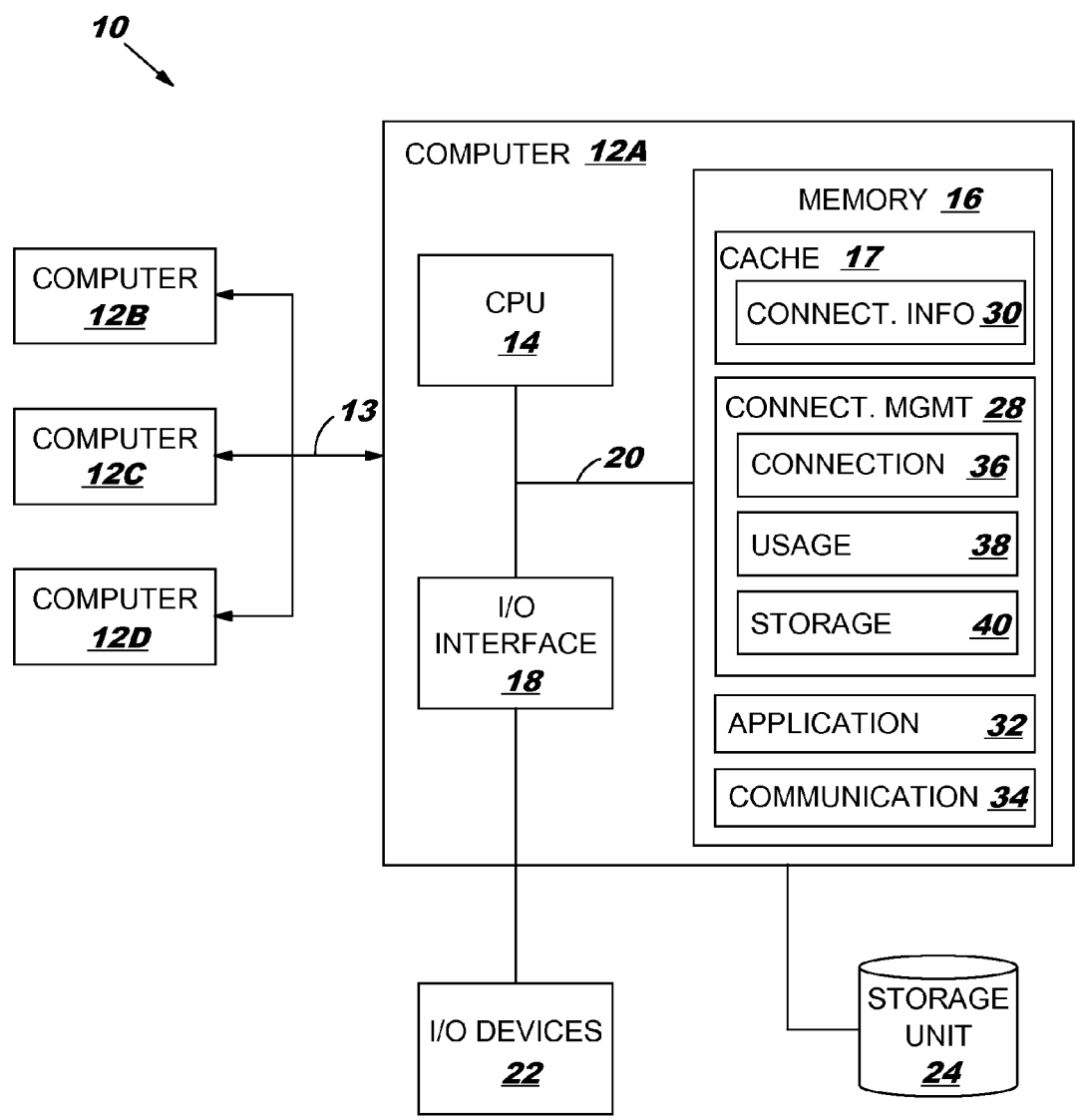
FIG. 1 depicts an illustrative system for managing a connection.

It is noted that the drawings of the invention are not to scale. The drawings are intended to depict only typical embodiments of the invention, and therefore should not be considered as limiting the scope of the invention. In the drawings, like numbering represents like elements between the drawings.

BEST MODES FOR CARRYING OUT THE INVENTION

As noted above, the invention provides a method, system, and program product for managing a connection. In particular, the invention can determine an expected usage when the connection is generated and/or update the expected usage during the life of the connection. In any event, the invention manages connection information (e.g., connection context) in memory based on the expected usage of the corresponding connection. For example, connection information for a connection that has a high expected usage can be stored in cache memory for faster access. Similarly, the connection information for a connection having a low expected usage can be swapped out of the cache memory and stored in relatively slower memory. As a result, connection information for more frequently used connections will be more likely to be found in cache memory, thereby increasing the communications performance of the system.

Turning to the drawings, FIG. 1 depicts a system 10 for managing a connection according to one embodiment of the invention. As depicted, communications can occur between computer 12A and on one or more computers 12B-D via a communications link 13. To this extent, communications link 13 can comprise any now known or later developed mechanism for such purposes, e.g., a direct hardwired connection (e.g., serial port), or another type of network connection. In the latter case, the network can comprise an addressable connection in a client-server (or server-server) environment that may utilize any combination of wireline and/or wireless transmission methods. In this instance, the server and client may utilize conventional network connectivity, such as Token Ring, Ethernet, WiFi or other conventional communications standards. Further, the network can comprise any type of network, including the Internet, a wide area network (WAN), a local area network (LAN), a virtual private network (VPN), etc. Where the client communicates with the server via the Internet, connectivity could be provided by conventional TCP/IP sockets-based protocol, and the client would utilize an Internet service provider to establish connectivity to the server.

Computer 12A may be any type of general purpose/specific-use computerized system (e.g., a mobile phone, a handheld computer, a personal digital assistant, a portable (laptop) computer, a desktop computer, a workstation, a server, a mainframe computer, etc.), which is designed to drive the operation of the particular hardware and which is compatible with other system components and I/O controllers. As shown, computer 12A may generally include a central processing unit (CPU) 14, memory 16, input/output (I/O) interface 18, bus 20 and an optional storage unit 24. CPU 14 may comprise a single processing unit, or be distributed across one or more processing units in one or more locations, e.g., on a client and server.

Memory 16 may comprise any known type of data storage and/or transmission media, including magnetic media, optical media, random access memory (RAM), read-only memory (ROM), a data object, etc. Further, memory 16 is shown including a cache memory 17 that comprises a faster memory that can be used to decrease the amount of time required to obtain frequently used information. Storage system 24 may comprise any type of data storage for providing storage for information necessary to carry out the invention as described below. As such, storage system 24 may include one or more storage devices, such as a magnetic disk drive or an optical disk drive. Moreover, similar to CPU 14, memory 16 and/or storage system 24 may reside at a single physical location, comprising one or more types of data storage, or be distributed across a plurality of physical systems in various forms. To this extent, memory 16 and/or storage system 24 can include data distributed across, for example, a LAN, WAN or a storage area network (SAN) (not shown).

I/O interface 18 may comprise any system for exchanging information to/from an external I/O device. I/O devices 22 may comprise any known type of external device, including, for example, a communication device, speakers, a monitor/display, handheld device, keyboard, mouse, voice recognition system, speech output system, printer, facsimile, pager, etc. It is understood, however, that if computer 12A is a handheld device or the like, a display could be contained within computer 12A, and not as an external I/O device 22 as shown. Bus 20 provides a communication link between each of the components in computer 12A and likewise may comprise any known type of transmission link, including electrical, optical, wireless, etc. In addition, although not shown, additional components, such as communication systems, system software, etc., may be incorporated into computer 12A. Further, computers 12B-D typically include the same elements as shown in computer 12A (e.g., CPU, memory, I/O interface, etc.). These have not been separately shown and discussed for brevity.

Shown stored in memory 16 is a connection management system 28 that manages connections for computer 12A. In general, connection management system 28 manages connection information 30 that allows an application 32 to communicate with an application (not shown) on one or more computers 12B-D using communication system 34. Connection information 30 comprises various information about the corresponding connection. For example, connection information 30 can include one or more addresses for the communicating computers (e.g., computer 12A and computer 12B), a number of bytes communicated over the connection, a sequence number for messages, various status indicators, etc. To this extent, it is understood that the connection can comprise any type of connection, e.g., TCP/IP, FCP, SONET, etc., and connection information 30 for each type of connection varies.

Connection management system 28 is shown including a connection system 36, a usage system 38, and a storage system 40. Connection system 36 can obtain connection information 30 for the connection, and usage system 38 can determine an expected usage for the connection. Based on the expected usage, storage system 40 can manage connection information in memory 16. For example, if the expected usage is high, storage system 40 can store connection information 30 in cache memory 17. It is understood that the various systems shown in connection management system 28 are included for illustrative purposes only. As a result, one or more of the systems may be combined into a single system or not be implemented. Further, one or more of the systems can be implemented as a distinct program that can be executed separately from connection management system 28.

As noted, an expected usage can be determined by, for example, usage system 38. In one embodiment, connection system 36 could obtain the total number of messages required for the connection from an application 32 that requests the connection. Alternatively, a protocol header may indicate the total number of messages required for the connection, or an upper level protocol (e.g., File Transfer Protocol (FTP)) could provide the information to usage system 38. For example, when TCP packages the data into segments, the total number of segments could be placed in the TCP header and read by usage system 38. In any event, when connection information 30 needs to be swapped out of cache memory 17, storage system 40 can remove connection information 30 having the smallest number of messages that remain to be communicated using the connection. However, when the standard TCP/IP protocol is used, the total number of messages is not available. Further, the total number of messages may not be known when a connection is requested, or for every connection managed by connection management system 28. As a result, usage system 38 may need to estimate the expected usage.

In one embodiment, usage system 38 can determine the expected usage by counting a number of messages that have been communicated using the connection. It is understood that throughout the discussion, "message" can be interpreted as referring to all communications required to successfully communicate a given amount of data between two computers 12A-D. For example, a single message can comprise the exchange of a data message that includes the data sent from a source computer to a destination computer, and an acknowledgement message (ACK) that is sent from the destination computer in return. Further, the single message could comprise one or more retries of the data message and/or one or more negative acknowledgements (NAK) that are exchanged when the data message is not properly received. Alternatively, each received and/or sent message (e.g., data message, ACK, NAK, etc.) could be, for example, counted individually as a message.

In any event, the number of messages that have been counted for the connection could be used to implement a "most frequently used" (MFU) selection algorithm. In this case, when a cache memory 17 swap is required, storage system 40 would give preference to connections having a high number of messages. For example, a connection having two messages could be selected for removal from cache memory 17 before a connection having six messages.

Alternatively, the number of messages for a connection can be used to classify the connection as "long lived" or "short lived." A short lived connection comprises a connection that requires relatively few messages, while a long lived connection would require a relatively high number of messages. In one embodiment, the expected number of messages, and therefore the classification of a connection, can be estimated using a statistical approach. In this case, each new connection can be initially marked as short lived since most connections may be short lived connections. A threshold value can be used to re-mark a connection from short lived to long lived. The threshold value can be pre-set, user selected, and/or adjusted based on previous connections and the corresponding number of messages communicated using each. For example, it may be determined that many connections communicate one or two messages, but once a third message is communicated, more than ten messages are generally communicated using the connection. As a result, a connection could be marked as long lived once a third message is communicated using the connection.

Once a connection is classified as long lived, storage system 40 can give preference to the corresponding connection information 30 in cache memory 17. For example, a bit can be associated with each connection to indicate whether the connection has been marked as long lived. The bit could be stored as part of connection information 30 or as part of a separate table that can be quickly scanned by hardware and/or software techniques. When storage system 40 determines that a swap is required for cache memory 17, the bits can be scanned and connection information 30 for a connection not marked as long lived can be selected for removal.

In another embodiment, usage system 38 can determine an expected usage for the connection by using a size of a message communicated using the connection. For example, when a most recently communicated message comprises the maximum size allowed, usage system 38 could determine that the connection has a high expected usage. Conversely, when the most recently communicated message is smaller than the maximum size allowed, usage system 38 could determine that the connection has a low expected usage. In any event, storage system 40 would give preference in cache memory 17 for connection information 30 for a connection having a high expected usage. As a result, when a swap is required, storage system 40 would remove from cache memory 17 connection information 30 for a connection having a low expected usage.

In still another embodiment, usage system 38 can determine an expected usage for the connection by determining a type of application 32 that requested the connection. For example, connection system 36 can receive a request for a connection from application 32. In the request, application 32 could indicate that it comprises a type of application that communicates disk data using, for example, Small Computer System Interface (SCSI) commands communicated over TCP/IP (iSCSI). When generating the requested connection, connection system 36 could store the type of application in connection information 30 for use by usage system 38 in determining an expected usage. For example, usage system 38 would assign a high expected usage for an application 32 that communicates disk data, since disk data is typically communicated in large blocks (e.g., Megabytes) that require numerous messages.

Still further, usage system 38 could analyze the content of a message communicated using a connection. For example, when an application 32 is transferring data using the iSCSI protocol, an initial message is used to send a "login" command to initiate the transfer of the disk data. When usage system 38 determines that a message comprising an iSCSI login command was communicated using a connection, the connection can be assigned a high expected usage.

It is understood that usage system 38 can use any combination of solutions for determining expected usage. For example, as discussed above, usage system 38 can use a bit to assign a connection as a long lived connection, and maintain a count of the messages communicated. In this case, when storage system 40 determines that cache memory 17 requires a swap, the bit for the long lived connection can be used. However, if cache memory 17 only includes connection information 30 for long lived connections, connection information 30 for a connection having a lowest count of messages can be selected for removal.

Additionally, storage system 40 can manage connection information 30 in memory 16 based on a time period since connection information 30 was used. For example, storage system 40 can store the time that connection information 30 was used for each connection. When a swap is required for cache memory 17, the expected usage can first be used to determine connection information 30 to remove. However, the expected usage may not sufficiently distinguish between two or more connections (e.g., all connections are marked as long lived). In this case, the time period since the connection information 30 was last used can be used to determine which connection information 30 to remove. For example, the connection information 30 that has the largest time period can be removed (i.e., least recently used (LRU)), since this may indicate that the connection has timed out. Further, usage system 38 can use the time period to determine the expected usage. For example, a long lived connection can be re-marked as a short lived connection after a certain amount of time has passed since connection information 30 has been used.

It is understood that the long lived connection bit described above can be implemented as part of cache memory 17, e.g., using one or more of the least recently used (LRU) bits typically included in a control structure for cache memory 17 or by constructing a mechanism in a standard cache control structure in which entries marked as long lived are not aged as is typical of LRU cache algorithms. Further, the time period described above can be stored as a field retrievable from connection information 30. Alternatively, some or all of the data described above can be stored and linked to a corresponding connection apart from connection information 30. In the latter case, the data can be stored as part of a separate table that can be quickly scanned by hardware and/or software techniques.

Figure 2:
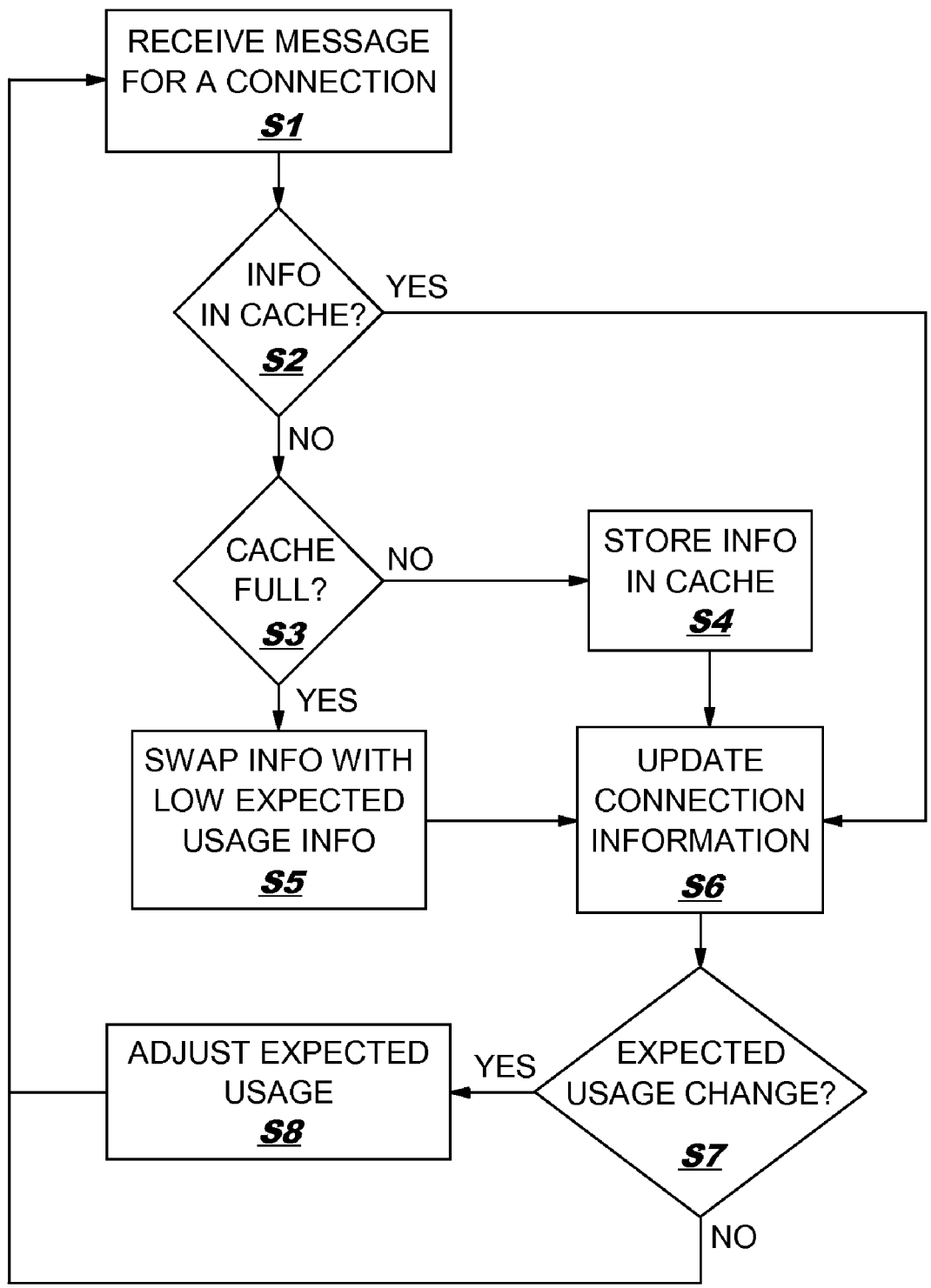
FIG. 2 depicts illustrative method steps performed when a message is received.

FIG. 2 shows illustrative method steps performed when a message is received by computer 12A (FIG. 1) according to one embodiment of the invention. In step S1, communication system 34 (FIG. 1), for example, receives the message and matches the message with a connection. In step S2, storage system 40 (FIG. 1) can determine if the connection information 30 (FIG. 1) for the matched connection is in cache memory 17 (FIG. 1). If connection information 30 is not in cache memory 17, i.e., NO at step S2, then flow passes to step S3 in which storage system 40 can determine if cache memory 17 is full and therefore requires a swap. If cache memory 17 is not full, i.e., NO at step S3, then in step S4, connection information 30 is stored in cache memory 17. However, when cache memory 17 is full, i.e., YES at step S3, then in step S5, storage system 40 can select a connection that has a low expected usage (e.g., marked as short lived, low number of messages, and/or longest time since used), and swap its connection information 30 out of cache memory 17 in exchange for connection information 30 for the matched connection.

In any event, in step S6, storage system 40 can update connection information 30 for the matched connection (e.g., increase message count, update time used, etc.). In step S7, usage system 38 (FIG. 1) can determine if the expected usage for the connection should be changed. For example, usage system 38 can determine if the number of messages exceeds a threshold amount to classify the connection as long lived. If YES, in step S8, usage system 38 can adjust the expected usage (e.g., mark connection as long lived). If NO at step S7 or after step S8, control returns to step S1 until another message is received by computer 12A. While the various steps have been described as occurring in a particular sequence, it is understood that independent steps can be performed simultaneously or in a different order than that described herein. Further, it is understood that fewer or additional steps may be performed for various embodiments of the invention.

It is understood that the invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls system 12, and/or a user 30 system such that they carry out the respective methods described herein. Alternatively, a specific use computer (finite state machine), containing specialized hardware for carrying out one or more of the functional tasks of the invention, could be utilized. The invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various embodiments of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

INDUSTRIAL APPLICABILITY

The invention is useful for managing connections, and more particularly for storing connection information for a connection that is more frequently used in a faster memory.

What is claimed is:

1. A method of managing a connection, the method comprising:
    obtaining connection information for the connection including an initial message and a subsequent message;
    determining an initial expected usage for the connection based on the initial message;
    modifying the initial expected usage for the connection to generate an updated expected usage for the connection based on the subsequent message; and managing the connection information in memory based on the updated expected usage, wherein the managing of the connection information includes storing the connection information for the connection in either of a memory or a cache memory based on the updated expected usage for the connection by:
  removing connection information for a connection having a low expected usage from the cache memory; and
  storing connection information in the cache memory of a connection having a high expected usage.

2. The method of claim 1, wherein the modifying includes counting a number of messages communicated using the connection.

3. The method of claim 2, wherein the modifying further includes marking a connection as long lived when the number of messages exceeds a threshold value.

4. The method of claim 1, wherein the determining includes determining a size of a message communicated using the connection.

5. The method of claim 1, further comprising:
  receiving a request for the connection from an application; and
  generating the connection for the application.

6. The method of claim 5, wherein the determining includes determining a type of the application.

7. The method of claim 1, wherein the determining includes analyzing the connection information for the connection.

8. The method of claim 1, further comprising determining a time period since the connection information was used, wherein the managing is further based on the time period.

9. A connection management system, comprising:
  a connection system that obtains connection information for a connection including an initial message and a subsequent message;
  a usage system that determines an initial expected usage for the connection based on the initial message and modifies the initial expected usage for the connection to generate an updated expected usage for the connection based on the subsequent message; and
  a storage system that manages the connection information in memory based on the updated expected usage, wherein the storage system is configured to store the connection information for the connection in either of a memory or a cache memory based on the updated expected usage for the connection by:
    removing connection information for a connection having a low expected usage from the cache memory; and
    storing connection information in the cache memory of a connection having a high expected usage.

10. The system of claim 9, wherein the connection comprises at least one of: an FCP connection and a TCP/IP connection.

11. The system of claim 9, wherein the connection system further generates the connection for an application.

12. The system of claim 9, wherein the storage system removes the connection information for a connection having a low expected usage from a cache memory.

13. The system of claim 9, further comprising a communication system for communicating messages using the connection.

14. The system of claim 13, wherein the expected usage is based on the messages.

15. The system of claim 9, wherein the expected usage is based on at least one of:
  an application that requested the connection and the connection information for the connection.

16. A computer program product comprising a non-transitory computer readable storage medium having computer readable program code embodied therein for managing a connection, the program product comprising:
  program code configured to obtain connection information for the connection including an initial message and a subsequent message;
  program code configured to determine an initial expected usage for the connection based on the initial message;
  program code configured to modify the initial expected usage for the connection to generate an updated expected usage for the connection based on the subsequent message; and
  program code configured to manage the connection information in memory based on the updated expected usage, wherein the program code stores the connection information for the connection in either of a memory or a cache memory based on the updated expected usage for the connection by:
    removing connection information for a connection having a low expected usage from the cache memory; and
    storing connection information in the cache memory a connection having a high expected usage.

17. The computer program product of claim 16, further comprising:
  program code configured to receive a request for the connection from an application; and
  program code configured to generate the connection for the application.

18. The computer program product of claim 16, further comprising program code configured to communicate messages using the connection.

19. The computer program product of claim 16, further comprising program code configured to determine a time period since the connection information was used.

* * * * *